(12) United States Patent
Rong et al.

(10) Patent No.: US 9,640,973 B2
(45) Date of Patent: *May 2, 2017

(54) HYBRID HIGH-VOLTAGE DC BREAKER

(71) Applicant: Xi'an Jiaotong University, Xi'an, Shanxi (CN)

(72) Inventors: Mingzhe Rong, Shanxi (CN); Yi Wu, Shanxi (CN); Chunping Niu, Shanxi (CN); Yifei Wu, Shanxi (CN); Hao Sun, Shanxi (CN); Fei Yang, Shanxi (CN)

(73) Assignee: XI'AN JIAOTONG UNIVERSITY (CN)

( * ) Notice: Subject to any disclaimer, the term of this patent is extended or adjusted under 35 U.S.C. 154(b) by 21 days.

This patent is subject to a terminal disclaimer.

(21) Appl. No.: 14/157,765

(22) Filed: Jan. 17, 2014

(65) Prior Publication Data

US 2014/0217833 A1 Aug. 7, 2014

(30) Foreign Application Priority Data

Feb. 6, 2013 (CN) .......................... 2013 1 0049751

(51) Int. Cl.
*H02H 9/00* (2006.01)
*H02H 3/087* (2006.01)
*H02H 7/22* (2006.01)

(52) U.S. Cl.
CPC ............ *H02H 3/087* (2013.01); *H02H 7/222* (2013.01); *Y10T 307/747* (2015.04)

(58) Field of Classification Search
CPC ........ H01H 89/00; H02H 3/087; H02H 7/222; H02H 9/005
USPC .................... 307/113; 361/13, 100
See application file for complete search history.

(56) References Cited

U.S. PATENT DOCUMENTS

2012/0234796 A1* 9/2012 Juhlin ........................... 218/143

* cited by examiner

*Primary Examiner* — Thienvu Tran
*Assistant Examiner* — Kevin J Comber

(57) ABSTRACT

A hybrid high-voltage DC breaker, consists of a plurality of completely identical breaker modules connected in series. Each of the breaker modules comprises a main current circuit, a transfer current circuit, an over-voltage limiting circuit and a control system, wherein a high-speed mechanical switch, the transfer current circuit and the over-voltage limiting circuit are connected in parallel. The transfer current circuit consists of circuits 1-4, wherein the circuit 1 and the circuit 4 are connected in series at first and then connected with the main current circuit in parallel; a pre-charged capacitor is connected with the circuit 4 in parallel after being connected with the circuit 3 in series; and, one end of the circuit 2 is connected with the left end of the main current circuit while the other end thereof is connected with a connection point of the pre-charged capacitor and the circuit 3.

9 Claims, 15 Drawing Sheets

HYBRID HIGH-VOLTAGE DC BREAKER

FIELD OF THE INVENTION

The present invention relates to a hybrid high-voltage DC breaker, in particular to an application in the field of high-voltage grade by connecting a plurality of hybrid DC breaker modules in series.

BACKGROUND OF THE INVENTION

Hybrid DC breakers consisting of high-speed mechanical switches and large-power semiconductor devices, with advantages of large discharge current capacity, high turn-off speed, high current limitation and the like, have become a research hotspot in the DC breaking field. To limit and break a short-circuit current with a high rate of rise, a hybrid DC breaker must be rapid in response and reliable in action so as to turn off the fault circuit at an early stage of a short-circuit fault. Generally, the power semiconductor device acts very quickly, so the response speed of the mechanical switch becomes a bottleneck that restricts the breaking performance of a DC hybrid breaker. Meanwhile, there will be a transient over-voltage greater than the system voltage at two ends of the mechanical switch when a hybrid DC breaker cuts off a short-circuit current, so higher requirements have been proposed to the design of the transfer current circuits of hybrid DC breakers. By adjusting the topology of the transfer current circuit to control the rate of the over-voltage rise at the two ends in the case of short-circuit, the clearance between the contacts of the mechanical switch is allowed to withstand a voltage generated excessively during the breaking process, so that reliable breaking is ensured.

SUMMARY OF THE INVENTION

With regard to the above deficiencies or shortcomings of the prior art, an object of the present invention is to provide a hybrid high-voltage DC breaker and a control method thereof. The breaker consists of a plurality of completely identical breaker modules connected in series. By controlling the power semiconductor devices in the transfer current circuit via the breaker modules to turn on according to a certain timing sequence, the rate of the over-voltage rise at two ends of the breaker can be limited effectively; furthermore, as the capacitive current undergoes two times of transfer when the breaker modules break, the direction of the voltage on the pre-charged capacitor is consistent to the direction of the pre-charged voltage before action after the breaker modules break, so that the charge of the capacitor C is omitted. Meanwhile, a short-circuit current limiting function may be achieved by controlling parts of the breaker modules to perform an opening action.

To achieve the above object, the following technical solutions are employed in the present invention.

A hybrid high-voltage DC breaker is provided, consisting of a plurality of completely identical breaker modules connected in series, each of the breaker modules comprising a main current circuit, a transfer current circuit, an over-voltage limiting circuit, a control system. A high-speed mechanical switch FCB, the transfer current circuit and the over-voltage limiting circuit are connected in parallel, and the transfer current circuit consists of circuits 1-4, wherein: the circuit 1 and the circuit 4 are connected in series at first and then connected with the main current circuit in parallel; a pre-charged capacitor is connected with the circuit 4 in parallel after being connected with the circuit 3 in series; and, one end of the circuit 2 is connected with the left end of the main current circuit while the other end thereof is connected with a connection point of the pre-charged capacitor and the circuit 3. When voltage at two ends of the transfer current circuit reaches a turn-on threshold of the over-voltage limiting circuit, the over-voltage limiting circuit is turned on so that voltage at two ends of the main current circuit is limited within a certain range. A control system monitors the current amplitude and current rate of change of both the main current circuit and the circuit 1 in the transfer current circuit, and controls the high-speed mechanical switch of the breaker modules and the circuits 1-4 in the transfer current circuit to act in a certain timing sequence according to the monitoring results.

By the connection of hybrid breaker modules in series, the applied voltage grade can be improved. Meanwhile, as the connection of all breaker modules is convenient, the number of breaker modules to be connected in series can be adjusted according to the actual system voltage requirement. By the breaker provided by the present invention, the short-circuit breaking under a high-voltage grade may be achieved, and a short-circuit current limiting function under a high-voltage grade may also be achieved by controlling parts of the breaker modules to perform an opening action.

Specifically, the following technical solutions are employed in the present invention.

A hybrid high-voltage DC breaker is provided, consisting of n completely identical breaker modules, all of which are connected in series and the modules number is from 1 to n. S1-Sn+1 are n+1 system access terminals for the breaker modules, wherein each of the breaker modules comprises a main current circuit, a transfer current circuit, an over-voltage limiting circuit, a control system, and access terminals Si and Si+1 of the system, where $1 \leq i \leq n$, and the main current circuit, the transfer current circuit and the over-voltage limiting circuit are connected in parallel, wherein:

(1) the main current circuit consists of a high-speed mechanical switch and a power semiconductor device A0, which are connected in series, wherein: the access terminal Si is connected with one end of the high-speed mechanical switch to realize the connection of the access terminal Si with one end of the main current circuit; the other end of the high-speed mechanical switch is connected with one end of the power semiconductor device A0; and the other end of the power semiconductor device A0 is connected with the access terminal Si+1 to realize the connection of the access terminal Si+1 with the other end of the main current circuit;

(2) the transfer current circuit comprises a circuit 1 consisting of a power semiconductor device A1, a circuit 2 consisting of an inductor $L\_0$ and a power semiconductor device A2 connected in series, a circuit 3 consisting of an inductor $L\_1$ and a power semiconductor device A3 connected in series, a circuit 4 consisting of a power semiconductor device A4, and a pre-charged capacitor C pre-charged with a certain voltage, the circuit 1 being connected with the circuit 4 in series, the circuit 2 being connected with the circuit 3 in series, wherein:

(A) the circuit 1 is connected with the circuit 4 in series to form a branch 14 of the transfer current circuit, and the branch 14 is connected with the main current circuit in parallel, furthermore:

the access terminal Si is connected with one end of the power semiconductor device A1 to realize the connection with one end of the branch 14;

the other end of the power semiconductor device A1 is connected with one end of the power semiconductor device A4 to realize the connection in series of the circuit 1 with the circuit 4; and the other end of the power semiconductor device A4 is connected with the access terminal S2 to realize the connection of the other end of the branch 14 with the access terminal S2, in order to realize the connection in parallel of the branch 14 with the main current circuit;

(B) the circuit 2 is connected with the circuit 3 in series to form a branch 23 of the transfer current circuit, and the branch 23 is connected with the main current circuit in parallel, furthermore:

the access terminal Si is connected with one end of the inductor L_0 to realize connection with one end of the branch 23;

the other end of the inductor L_0 is connected with one end of the power semiconductor device A2;

the other end of the power semiconductor device A2 is connected with one end of the inductor L_1 to realize the connection in series of the circuit 2 with the circuit 3;

the other end of the inductor L_1 is connected with one end of the power semiconductor device A3; and the other end of the power semiconductor device A3 is connected with the access terminal S2 to realize the connection of the other end of the branch 23 with the access terminal Si+1, in order to realize the connection in parallel of the branch 23 with the main current circuit; and (C) the pre-charged capacitor C is connected between an endpoint between the circuit 1 and the circuit 4 and an endpoint between the circuit 2 and the circuit 3; and (3) the control system measures the current flowing through the access terminal Si or Si+1, the current flowing through the main current circuit, the current flowing through the circuit 1 in the transfer current circuit, the current flowing through the over-voltage limiting circuit, the voltage at two ends of the high-speed mechanical switch and the displacement of the high-speed mechanical switch, and controls the high-speed mechanical switch and the power semiconductor devices A1-A4 in the transfer current circuit to act by measuring the current amplitude and current rate of change of the main current circuit and the current amplitude and current rate of change of the circuit 1 in the transfer current circuit.

Wherein, When the breaker modules are in a normal operating state, current flows through the main current circuit, and the pre-charged capacitor C is pre-charged with a certain voltage, the direction of the voltage being opposite to the direction of a turn-on voltage drop of the main current circuit; at this moment, the circuits 1-4 in the transfer current circuit are all turned off, so that no current flows through the transfer current circuit and also no current flows through the over-voltage limiting circuit; and when the system needs to break, the control system first controls the high-speed mechanical switch in the main current circuit to open, however, at this moment, the contact of the high-speed mechanical switch is still closed as the high-speed mechanical switch has a mechanical time delay; and then, the control system determines whether the power semiconductor devices A1-A4 in the transfer current circuit to act or not and a corresponding timing sequence for action by measuring the current amplitude and current rate of change of the main current circuit and the current amplitude and current rate of change of the circuit 1 in the transfer current circuit.

Wherein, the control system comprises a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface, the processor calculating the amplitude and rate of change di/dt of the current flowing through the system, the main current circuit and the circuit 1, the human-computer interface displaying the state of the hybrid DC breaker and the results of calculation in real time.

Wherein, the power semiconductor devices A0 and A2 are power semiconductor devices with a single-way turn-on function or combinations thereof; and, the power semiconductor devices A1, A3 and A4 are power semiconductor devices with a single-way turn-on function and a half-controlled function or combinations thereof, and the power semiconductor devices with a half-controlled function include, but are not limited to, any one or combinations of more of a transistor, an IGCT, an IGBT and a GTO.

Wherein, according to different breaking ways of breakers, one or more of the power semiconductor devices A0-A4 are full-controlled devices.

Wherein, the over-voltage limiting circuit is turned-off in the case that the breaker modules operate normally, the leakage current being less than 1 µA; and the turn-on voltage threshold of the over-voltage limiting circuit is 1.5 times of the voltage of the system with the breaker.

Wherein, when in need of short-circuit current limiting, m breaker modules are controlled to perform a short-circuit current limiting action, to transfer current therein to the over-voltage limiting circuits of the breaker modules, so as to establish different voltages at two ends of the hybrid high-voltage DC breaker, where 0<m<n, and m is variable.

Wherein, during the current limiting process, the m breaker modules are controlled in turn to perform the short-circuit current limiting action.

Wherein, when in need of opening, all breaker modules in the hybrid high-voltage DC breaker are controlled to perform an opening action.

DETAILED DESCRIPTION OF THE INVENTION

The specific embodiments of the present invention will be described as below with reference to the drawings.

Figure 1:
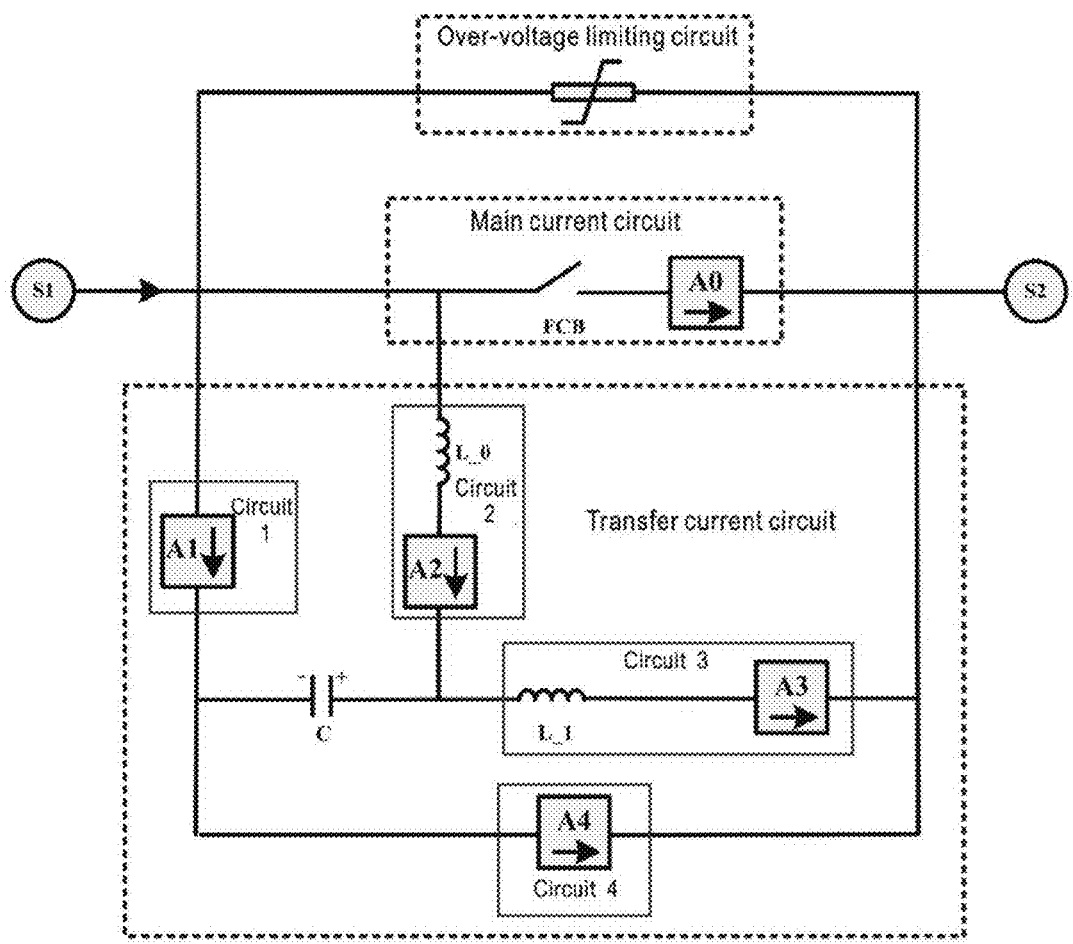
FIG. 1 is a structure diagram of a breaker module.
Figure 2:
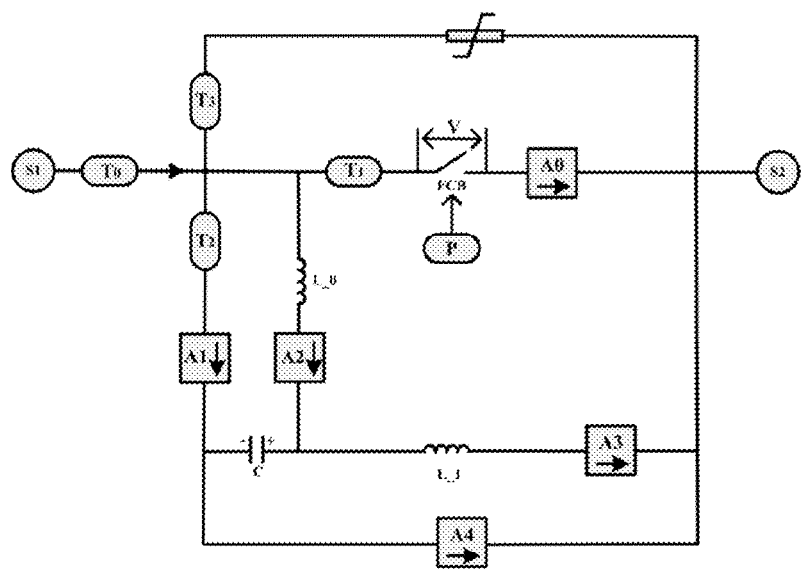
FIG. 2 is a distribution diagram of sensors of a control system in a breaker module.
Figure 3:
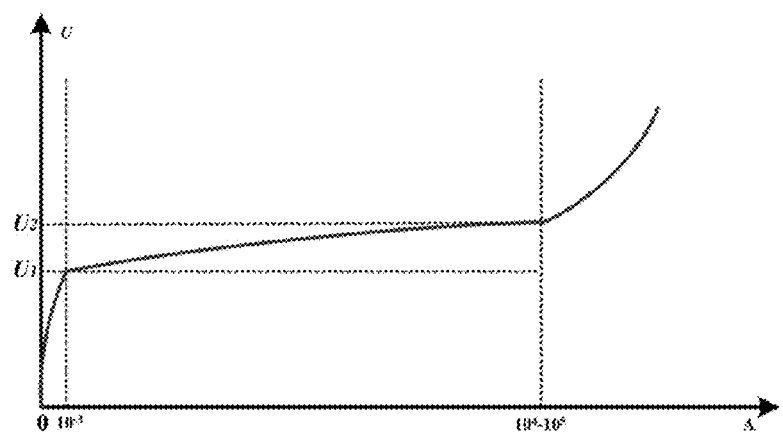
FIG. 3 is a volt-ampere characteristic graph of an over-voltage limiting circuit in a breaker module.
Figure 19:
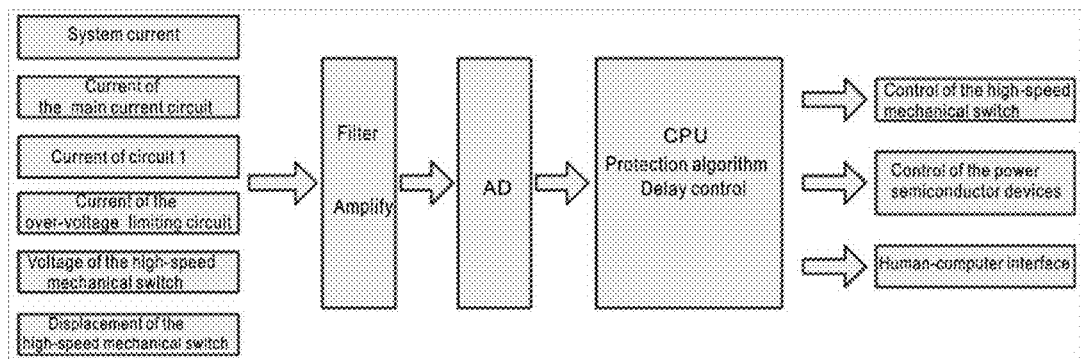
FIG. 19 is a block diagram of a control system in a breaker module.

FIG. 1 is a structure diagram of a breaker module comprising a main current circuit, a transfer current circuit and an over-voltage limiting circuit. FIG. 2 is a distribution diagram, in a hybrid breaker, of sensors of a control system in a breaker module. FIG. 3 shows a volt-ampere characteristic graph of an over-voltage limiting circuit. FIG. 19 is a block diagram of a control system of a breaker module.

Referring to FIG. 1, a hybrid breaker module is disclosed, comprising a main current circuit, a transfer current circuit, an over-voltage limiting circuit, a control system, and an access terminal S1 and an access terminal S2 of the system. The main current circuit, the transfer current circuit and the over-voltage limiting circuit are connected in parallel.

The main current circuit consists of a high-speed mechanical switch and a power semiconductor device A0, which are connected in series, wherein: the access terminal S1 is connected with one end of the high-speed mechanical switch to realize the connection of the access terminal S1 with one end of the main current circuit; the other end of the high-speed mechanical switch is connected with one end of the power semiconductor device A0; and the other end of the power semiconductor device A0 is connected with the access terminal S2 to realize the connection of the access terminal S2 with the other end of the main current circuit.

The transfer current circuit comprises a circuit 1 consisting of a power semiconductor device A1, a circuit 2 consisting of an inductor $L\_0$ and a power semiconductor device A2 connected in series, a circuit 3 consisting of an inductor $L\_1$ and a power semiconductor device A3 connected in series, a circuit 4 consisting of a power semiconductor device A4, and a pre-charged capacitor C pre-charged with a certain voltage. The circuit 1 is connected with the circuit 4 in series. The circuit 2 is connected with the circuit 3 in series.

Wherein: the circuit 1 is connected with the circuit 4 in series to form a branch 14 of the transfer current circuit, and the branch 14 is connected with the main current circuit in parallel, furthermore: the access terminal S1 is connected with one end of the power semiconductor device A1 to realize the connection with one end of the branch 14; the other end of the power semiconductor device A1 is connected with one end of the power semiconductor device A4 to realize the connection in series of the circuit 1 with the circuit 4; and the other end of the power semiconductor device A4 is connected with the access terminal S2 to realize the connection of the other end of the branch 14 with the access terminal S2, in order to realize the connection in parallel of the branch 14 with the main current circuit.

The circuit 2 is connected with the circuit 3 in series to form a branch 23 of the transfer current circuit, and the branch 23 is connected with the main current circuit in parallel, furthermore: the access terminal S1 is connected with one end of the inductor $L\_0$ to realize connection with one end of the branch 23; the other end of the inductor $L\_0$ is connected with one end of the power semiconductor device A2; the other end of the power semiconductor device A2 is connected with one end of the inductor $L\_1$ to realize the connection in series of the circuit 2 with the circuit 3; the other end of the inductor $L\_1$ is connected with one end of the power semiconductor device A3; and the other end of the power semiconductor device A3 is connected with the access terminal S2 to realize the connection of the other end of the branch 23 with the access terminal S2, in order to realize the connection in parallel of the branch 23 with the main current circuit.

The pre-chargepre-charged capacitor C is connected between an endpoint between the circuit 1 and the circuit 4 and an endpoint between the circuit 2 and the circuit 3.

The control system measures the current flowing through the access terminal S1 or S2, the current flowing through the main current circuit, the current flowing through the circuit 1 in the transfer current circuit, the current flowing through the over-voltage limiting circuit, the voltage at two ends of the high-speed mechanical switch and the displacement of the high-speed mechanical switch, and controls the high-speed mechanical switch and the power semiconductor devices A1-A4 in the transfer current circuit to act by measuring the current amplitude and current rate of change of the main current circuit and the current amplitude and current rate of change of the circuit 1 in the transfer current circuit.

Wherein, the power semiconductor devices A0 and A2 are power semiconductor devices with a single-way turn-on function or combinations thereof; and, the power semiconductor devices A1, A3 and A4 are power semiconductor devices with a single-way turn-on function and a half-controlled function or combinations thereof. The power semiconductor devices with a half-controlled function include, but are not limited to, any one or combinations of more of a transistor, an IGCT, an IGBT and a GTO. Understandably, both the half-controlled devices and the full-controlled devices have a half-controlled function.

However, according to different breaking ways of breakers, one or more of the power semiconductor devices A0-A4 are full-controlled devices.

Wherein, the over-voltage limiting circuit comprises one or combinations of more of a varistor, an MOV consisting of zinc oxide varistors, or an arrester.

Referring to FIG. 2 and FIG. 19, the control system of a breaker module comprises: a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface. The processor calculates the amplitude and rate of change di/dt of the current flowing through the system, the main current circuit and the circuit 1. The human-computer interface displays the state of the hybrid DC breaker and the results of calculation in real time.

1. Connection of Breaker Modules in Series

Figure 4:
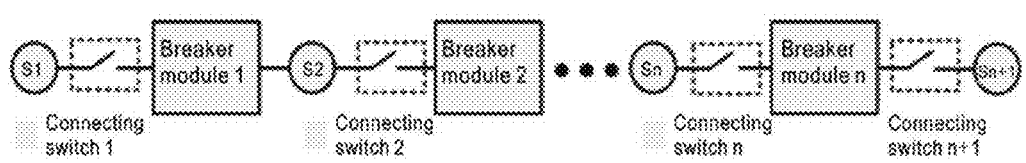
FIG. 4 is a structure diagram of the connection of breaker modules in series.

FIG. 4 shows a schematic diagram of the connection of the breaker modules in series, wherein S1-Sn+1 are system access terminals of n+1 breaker modules. For convenient connection of the breaker modules, the breaker modules are connected via connecting switches. The connecting switches may include, but are not limited to, isolating switches, vacuum switches, etc. The connecting switches are devices required during the connection in series, beyond the scope of the present invention. The connection of the breaker modules in series may improve the applied voltage grade of the hybrid high-voltage DC breaker. Meanwhile, as the connection of all breaker modules is convenient, the number of breaker modules to be connected in series can be adjusted according to the actual system voltage requirement.

2. Turn-On and Turn-Off Processes of the Over-Voltage Limiting Circuit of Each Breaker Module FIG. 3 shows a volt-ampere characteristic graph of the over-voltage limiting circuit, where, U1 is the turn-on threshold voltage of the over-voltage limiting circuit, and U2 is the highest voltage with voltage clamp action of the over-voltage limiting circuit. When the voltage at two ends of the over-voltage limiting circuit is less than U1, the over-voltage limiting circuit is cut off, and the leakage current of the over-voltage limiting circuit is less than 1 uA. That is, the over-voltage limiting circuit is turned off. After the voltage at two ends of the over-voltage limiting circuit reaches the turn-on threshold, the voltage at two ends of the over-voltage limiting circuit changes little with the sharp increase of the current. The design parameters of the over-voltage limiting circuit comprise capacity (absorbed energy) of the over-voltage limiting circuit, turn-on voltage threshold, current when the turn-on voltage is reached, the highest clamp voltage, and current when the highest clamp voltage is reached. When the current is greater than the current at the highest clamp voltage, the over-voltage limiting circuit will fail in the voltage clamp action. That is, the over-voltage limiting action will be failed. Usually, the turn-on threshold of the over-voltage limiting circuit is 1.5 times of that in the normal operating state. That is, after the over-voltage limiting circuit is turned on, due to the voltage clamp action of the over-voltage limiting circuit, the voltage at the two ends is higher than the system voltage when there is current (greater than 1 mA) in the over-voltage limiting circuit, and the over-voltage limiting circuit will be turned off until the system current is less than 1 mA.

Figure 5:
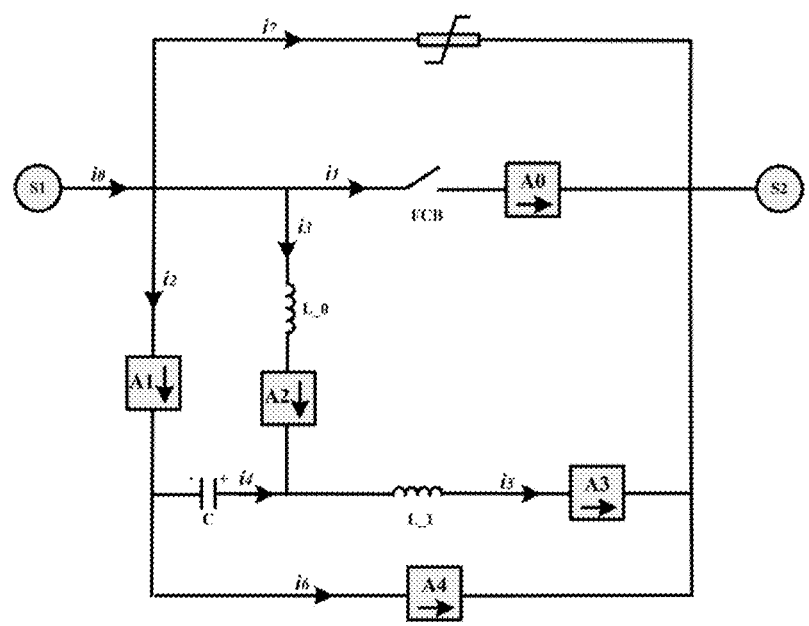
FIG. 5 is a schematic diagram of current flags of a transfer current circuit when the breaking current of each breaker module is greater than the rated current.

3. The Breaking Process of Each Breaker Module (1) In the Case that the Breaking Current is Greater than the Rated Current FIG. 5 shows current flags of each branch of the transfer current circuit when the breaking current of each breaker module is greater than the rated current, where, i0 is the current flowing through the access terminal S1 or S2, i1 is the current flowing through the main current circuit, i2 is the current flowing through the circuit 1, i3 is the current flowing through the circuit 2, i4 is the current flowing through the pre-charged capacitor C, i5 is the current flowing through the circuit 3, i6 is the current flowing through the circuit 4, and i7 is the current flowing through the over-voltage limiting circuit.

Figure 6:
FIG. 6(a) to FIG. 6(i) are a view of the flow direction of current of the transfer current circuit when the breaking current of each breaker module is greater than the rated current.
Figure 6:
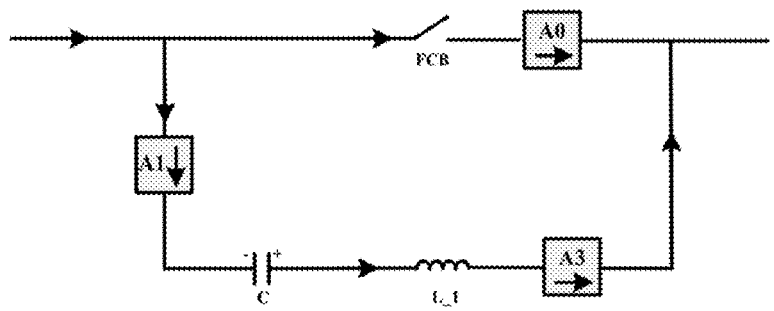
Figure 6:
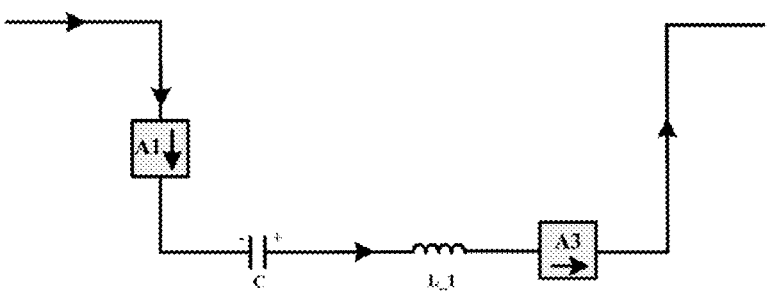
Figure 6:
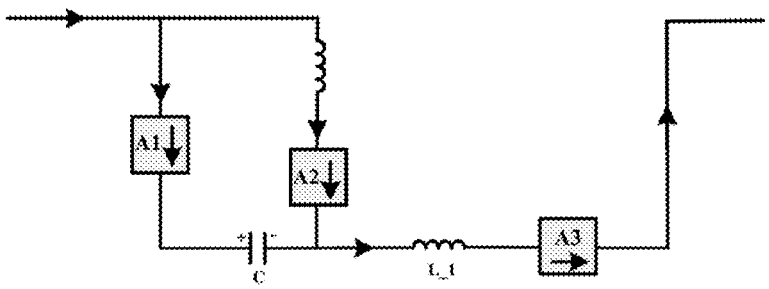
Figure 6:
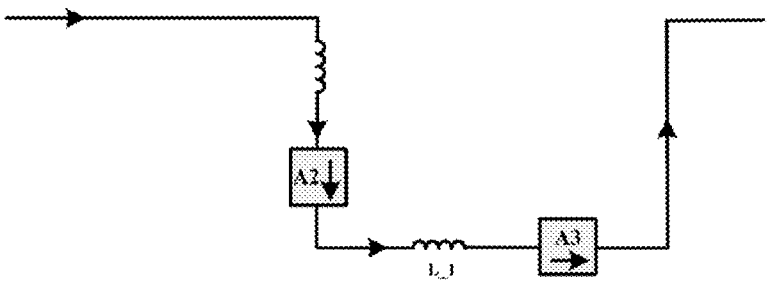
Figure 6:
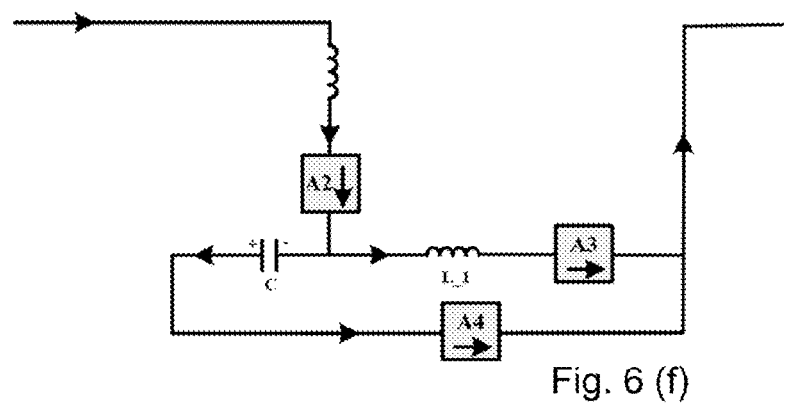
Figure 6:
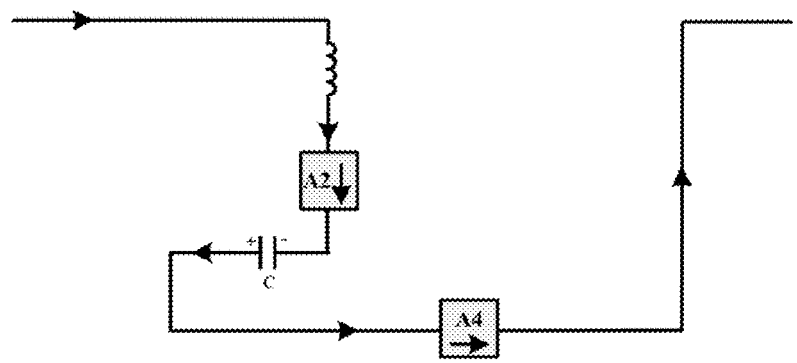
Figure 6:
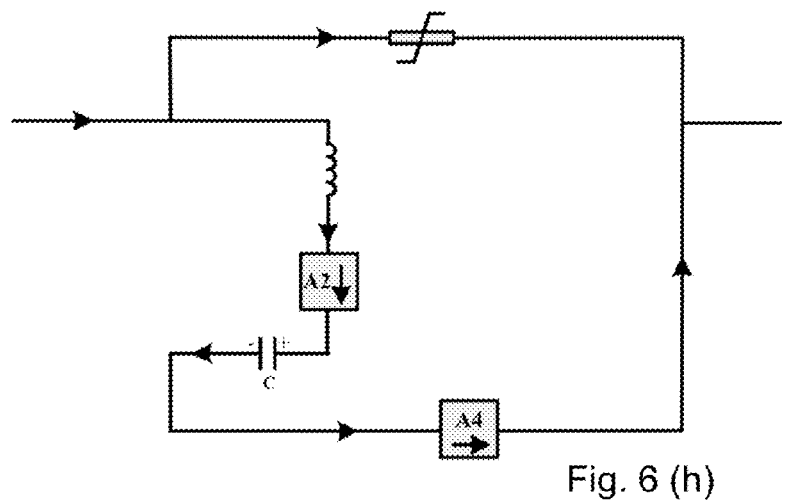
Figure 6:
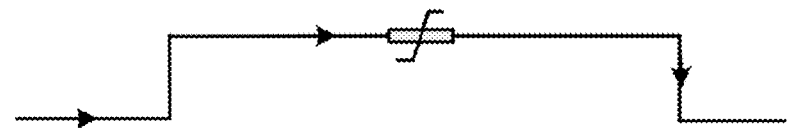
Figure 7:
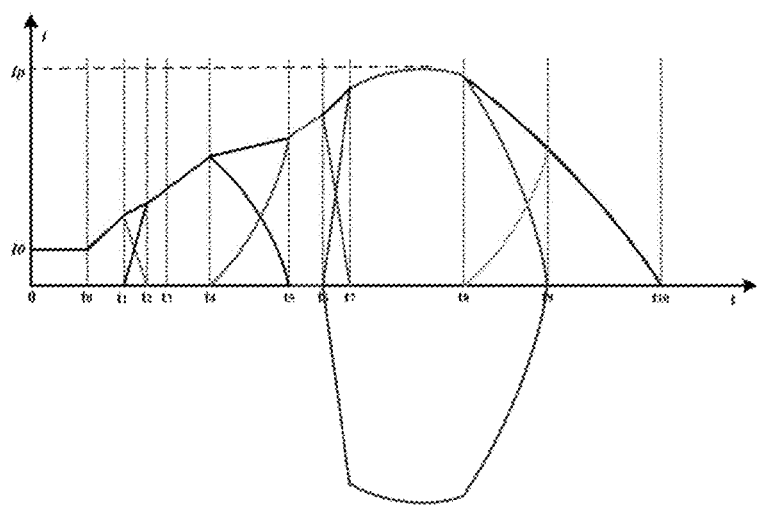
FIG. 7 is a view after overlapping all current change curves when the breaking current is greater than the rated current.
Figure 8:
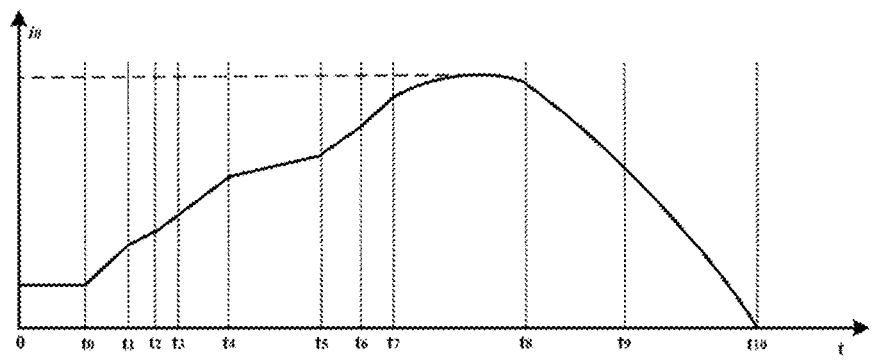
FIG. 8(a) to FIG. 8(h) are a current change graph of the transfer current circuit, corresponding to FIG. 7, when the breaking current is greater than the rated current.
Figure 8:
Figure 8:
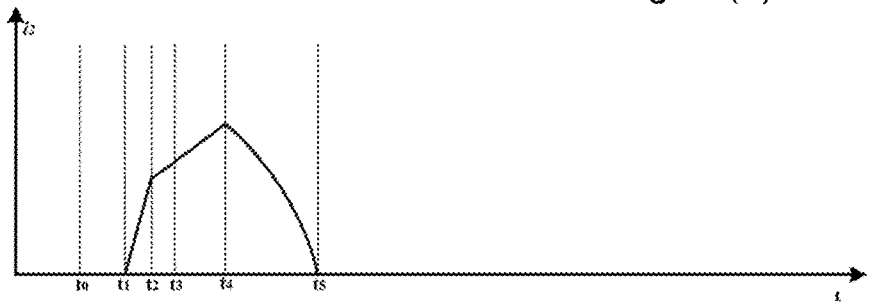
Figure 8:
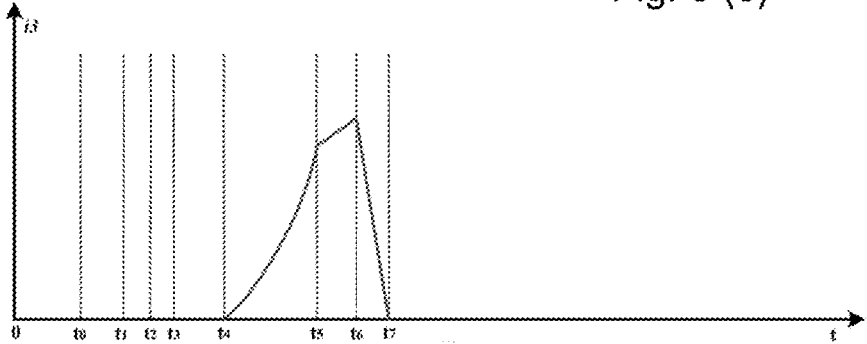
Figure 8:
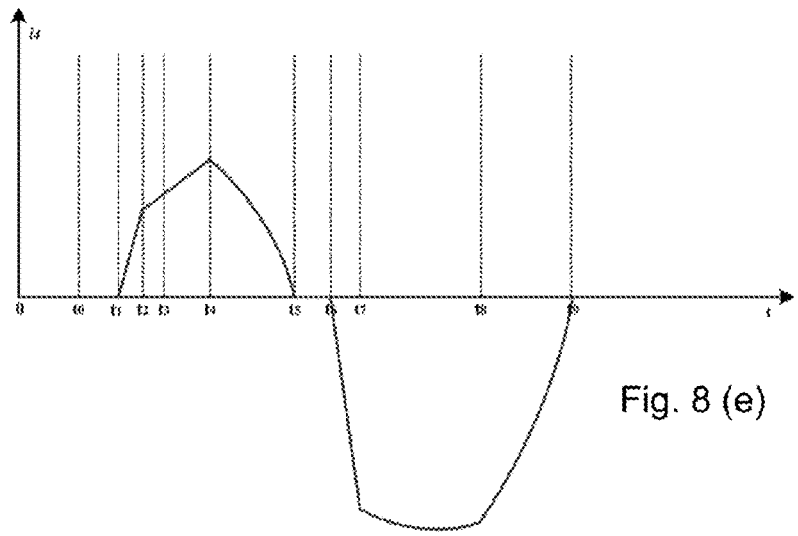
Figure 8:
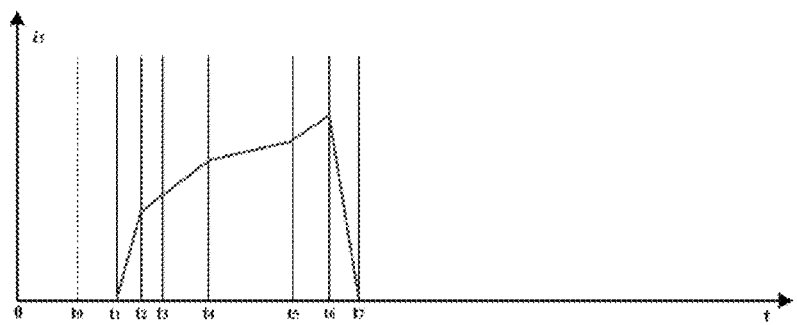
Figure 8:
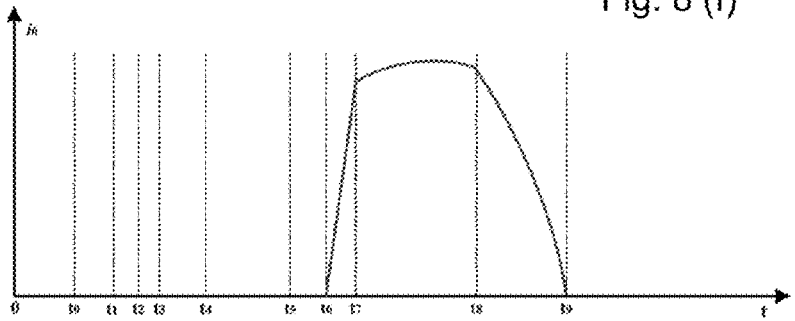
Figure 8:
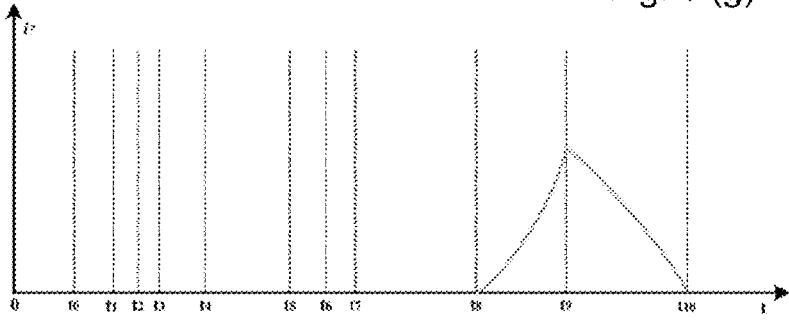

FIG. 6 shows the direction of current of all branches of the transfer current circuit when the breaking current of each breaker module is greater than the rated current, particularly the direction of current of all branches from t0 to t9. FIG. 7 shows a view after overlapping all current change curves when the breaking current is greater than the rated current. FIG. 8 shows a current change graph of all branches of the transfer current circuit, corresponding to FIG. 7, when the breaking current is greater than the rated current. The specific operating steps comprise the following aspects:

1) As shown in FIG. 7 and FIG. 8($a$), before t0, the system operates normally, and current all flows through the main current circuit, as shown in FIG. 6($a$), where, the rated voltage of the system is U0 and the rated current is a first rated current I0.

2) At t0, the system has a short-circuit fault, as a result, the current of the main current circuit starts to rise. From t0 to t1, when the current exceeds the short-circuit threshold of the system, the control system acts. As the delay time of the high-speed mechanical switch is longer than the response time of the power semiconductor devices, the high-speed mechanical switch is controlled to perform an opening action at first.

3) At t1, as shown in FIG. 6($b$), the power semiconductor devices A1 and A3 are controlled to turn on. As the direction of the voltage at two ends of the pre-charged capacitor is opposite to the direction of the voltage at two ends of the main current circuit, that is, the voltage drop at two ends of the branch consisting of the power semiconductor device A1, the capacitor C, the inductor L_1 and the power semiconductor devices A3 is lower than the voltage drop at two ends of the main current circuit. The current flowing through the main current circuit starts to transfer downward, that is, it starts to drop and i2 starts to rise, as shown in FIG. 8($b$) and FIG. 8($c$).

Figure 9:
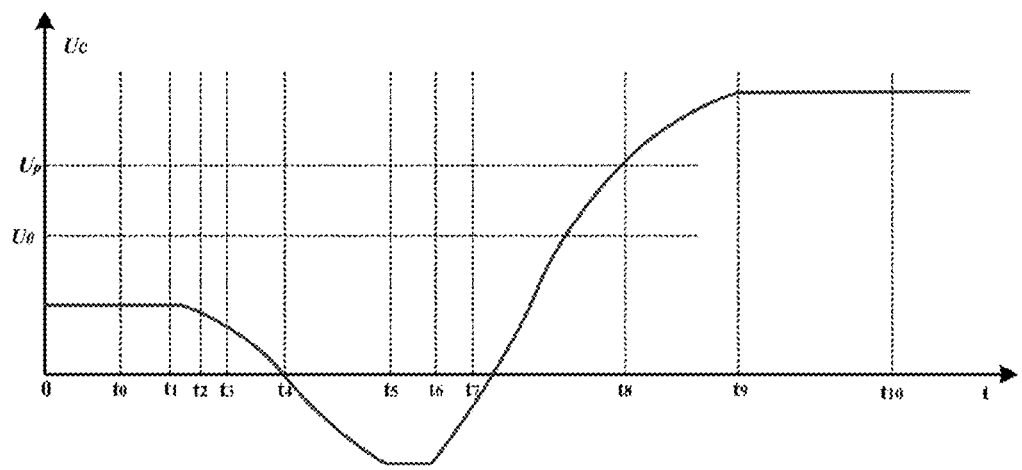
FIG. 9 is a graph of voltage of a pre-charged capacitor when the breaking current of each breaker module is greater than the rated current.

4) At t2, as shown in FIG. 6($c$), the current of the high-speed mechanical switch all transfers to the branch consisting of the power semiconductor device A1, the capacitor C, the inductor L_1 and the power semiconductor device A3. As shown in FIG. 9, the direction of the voltage at two ends of the capacitor C is kept unchanged.

5) At t3, the contacts of the high-speed mechanical switch are opened without an electric arc, and two ends of each hybrid breaker module start to have a voltage. As the direction of voltage of the capacitor C is still kept unchanged, the voltage drop at two ends of each hybrid breaker module is negative. From t3 to t4, due to the presence of the inductor L_1, the voltage U at two ends of each breaker module is higher that the voltage Uc on the capacitor C, that is, the direction of the voltage U at two ends of each breaker module is changed prior to the change of the voltage of the capacitor C.

6) At t4, the direction of the voltage of the capacitor starts to reverse, thus the voltage at two ends of the circuit 2 is equal to the sum of the voltage drop of the power semiconductor device A1 and the voltage drop of the capacitor C. As the value of this voltage is positive, the power semiconductor device A2 is turned on. As shown in FIG. 6(*d*), the current starts to transfer from the circuit 1 to the circuit 2. FIG. 8(*c*) and FIG. 8(*d*) show change curves of currents i2 and i3. Then, the voltage U at two ends of the breaker continues to rise.

7) At t5, the current in the circuit 1 all transfers to the circuit 2, as shown in FIG. 6(*e*). The power semiconductor device A1 in the circuit 1 is cut off. At this moment, the current flowing through the capacitor C is 0, and the direction of voltage on the capacitor C is opposite to the direction of the initial pre-charged voltage. When the current of the circuit 1 is cut off, the voltage at two ends of the breaker is turned into the sum of the voltage of the transfer current circuit and the voltage of the branch 23 from the sum of the voltage of the circuit 1, the voltage of the capacitor C and the voltage of the circuit 3. Therefore, the voltage at two ends of the breaker has a voltage jump Δu1 after t5. As it takes a certain period of time to all cut off A1, the time from t5 to t6 is the reserved cut-off time for the power semiconductor device A1. FIG. 8(*d*), FIG. 8(*e*) and FIG. 8(*f*) show change curves of currents i3, i4 and i5.

8) At t6, the power semiconductor device A4 in the circuit 4 is turned on, as shown in FIG. 6(*f*). The sum of the voltage of the capacitor C and the voltage at two ends of the circuit 4 is negative, so the current in the circuit 3 starts to transfer to the capacitor C and the circuit 4. When the circuit 4 is turned on, the voltage at two ends of each breaker module will be turned into the sum of the voltage of the circuit 2, the voltage of the capacitor C and the voltage of the circuit 4 from the sum of the voltage of the transfer current circuit and the voltage of the branch 23, so there is a voltage jump Δu2. As the direction of current flowing through the capacitor C is opposite, the voltage of the capacitor starts to rise forward. FIG. 8(*d*), FIG. 8(*e*), FIG. 8(*f*) and FIG. 8(*g*) show change curves of currents i3, i4, i5 and i6.

9) At t7, the current in the circuit 3 all transfers to the capacitor C and the circuit 4, as shown in FIG. 6(*g*). Then, the circuit 4 is turned off without current, and the voltage of the capacitor C continues to rise forward due to charging. Within a certain period of time after t7, the direction of the voltage will change. With the rise of the charging voltage of the capacitor, the current in the breaking process reaches a peak Ip when the voltage at two ends of each breaker module reaches the system voltage U0. Then, the system current starts to drop as the voltage at two ends of each breaker module is higher than the system voltage.

10) At t8, the sum of the voltage of the circuit 2, the voltage of the capacitor C and the voltage of the circuit 4 (the voltage at two ends of each breaker module) reaches the turn-on threshold of the over-voltage limiting circuit, so the over-voltage limiting circuit is turned on. As shown in FIG. 6(*h*), the current starts to transfer to the over-voltage limiting circuit. At this moment, the current of the capacitor C decreases, but the capacitor C is still in the state of charging. Therefore, the voltage of the capacitor C and the voltage at two ends of each breaker module continue to rise. However, the rise range is very small because of the voltage clamp action of the over-voltage limiting circuit. FIG. 8(*g*) and FIG. 8(*h*) show change curves of currents i6 and i7.

11) At t9, the current in the circuit 2, the capacitor C and the circuit 4 all transfers to the over-voltage limiting circuit. At this moment, the voltage of the capacitor C and the voltage at two ends of each breaker module reach a highest value, where, Up is a peak of the over-voltage at two ends of each breaker module in the breaking process. As the voltage of the circuit 2 and the voltage of the circuit 4 mainly depend on the voltage of the inductor L_0, and the current of the inductor L_0 is opposite to the current on the voltage Uc of the capacitor C during the drop of current, the peak of the voltage Uc of the capacitor is higher than the peak Up of the voltage at two ends of each breaker module. In addition, as the system current is dropping, the current in the over-voltage limiting circuit starts to drop, and the voltage at two ends of each breaker module also starts to drop slowly. When the system current is less than the minimal turn-on current 1 mA of the over-voltage limiting circuit, the over-voltage limiting circuit is turned off, and the voltage at two ends of the over-voltage limiting circuit drops rapidly.

12) At t10, the current in the over-voltage limiting circuit is 0, the breaking of a breaker module is completed, and the voltage at two ends of the breaker drops to the system voltage. FIG. 8(*a*) shows a change curve of the system current during the whole breaking process of a breaker module.

Figure 10:
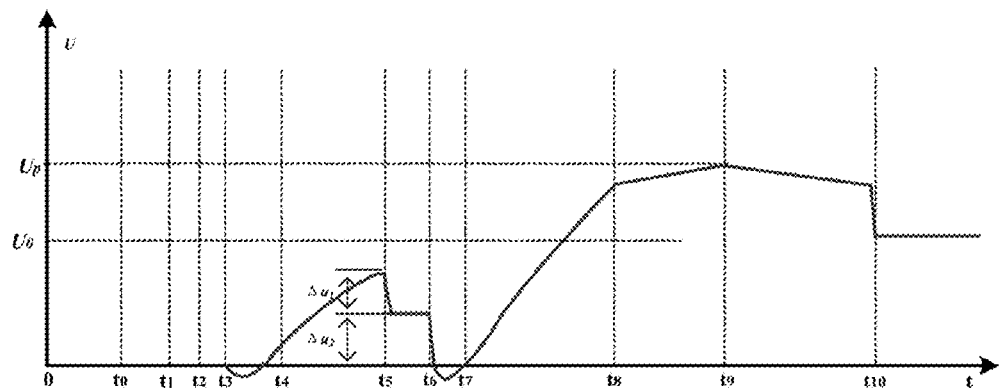
FIG. 10 is a graph of voltage at two ends of each breaker when the breaking current is greater than the rated current.

From the above breaking process, it can be found that the non-arc opening of the mechanical contacts is realized by connecting the high-speed mechanical switch with the power semiconductor devices in series, the medium between the contacts has good recovery property, and each breaker module has a strong breaking over-voltage withstand capacity. Meanwhile, each breaker module basically realizes breaking by turning the over-voltage limiting circuit on via the charging voltage of the capacitor C, and may limit the rate of rise of the voltage in the breaking process by controlling the direction of current on the capacitor C. FIG. 9 and FIG. 10 show a curve of the voltage of the pre-charged capacitor and a curve of the voltage at two ends of the breaker when the breaking current of each breaker is greater than the rated current, respectively. Referring to FIG. 9 and FIG. 10, two drop processes Δu1 and Δu2 of the voltage at two ends of each breaker module limit the rise of the voltage at two ends of the breaker module, thus providing a certain period of time for the motion of the contacts of the high-speed mechanical switch, and avoiding the restrike of the mechanical switch. As the direction of the voltage of the capacitor C is changed two times in the breaking process, the direction of the voltage of the capacitor C is consistent to the direction of the pre-charged voltage at the end of breaking, thus the charging of the capacitor C is avoided in the next time of breaking.

Figure 11:
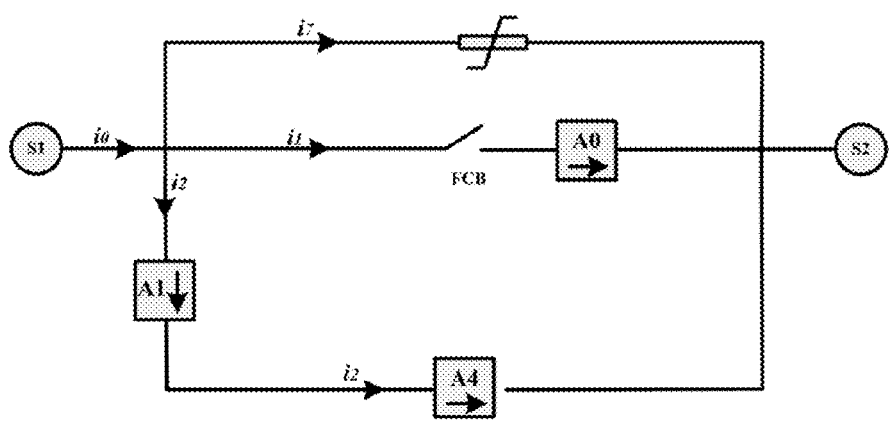
FIG. 11 is a schematic diagram of current flags of the transfer current circuit of each breaker module when the breaking current is less than or equal to the rated current.

(2) In the case that the breaking current is less than or equal to the rated current FIG. 11 shows current flags of all branches of the transfer current circuit when the breaking current of each breaker module is less than or equal to the rated current, where, i0 is the current flowing through the access terminal S1 or S2, i1 is the current flowing through the main current circuit, i2 is the current flowing through the circuit 1, and i7 is the current flowing through the over-voltage limiting circuit.

Figure 12:
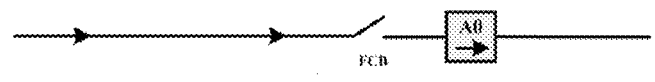
FIG. 12(a) to FIG. 12(d) are a view of the flow direction of current of the transfer current circuit when the breaking current of each breaker module is less than or equal to the rated current.
Figure 12:
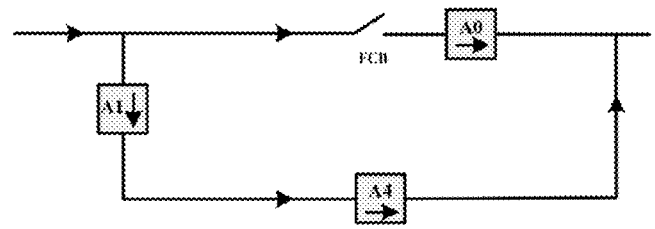
Figure 12:
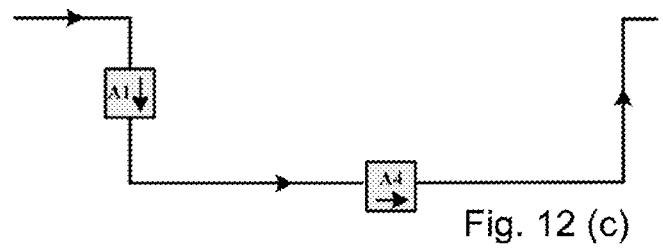
Figure 12:
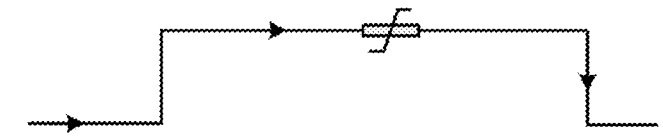
Figure 13:
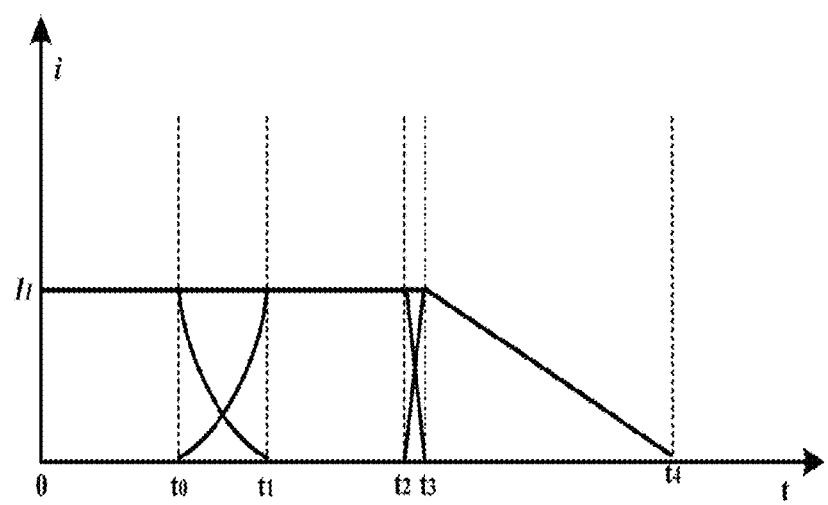
FIG. 13 is a view after overlapping all current change curves when the breaking current is less than or equal to the rated current.
Figure 14:
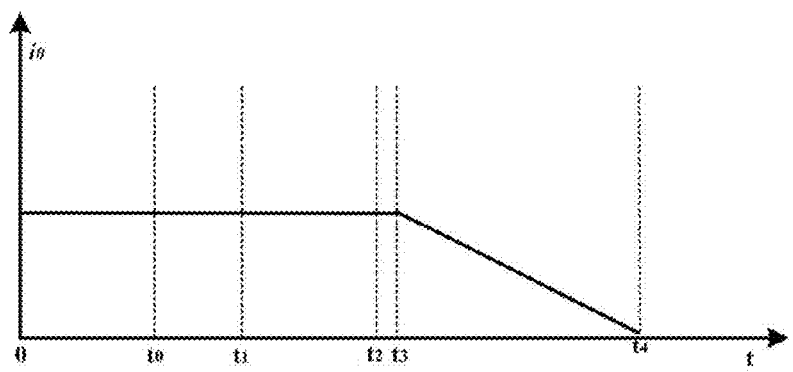
FIG. 14(a) to FIG. 14(d) are a current change graph of the transfer current circuit, corresponding to FIG. 13, when the breaking current is less than or equal to the rated current.
Figure 14:
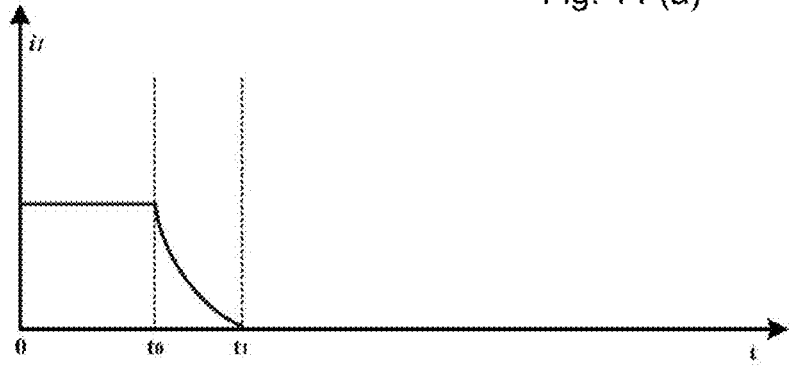
Figure 14:
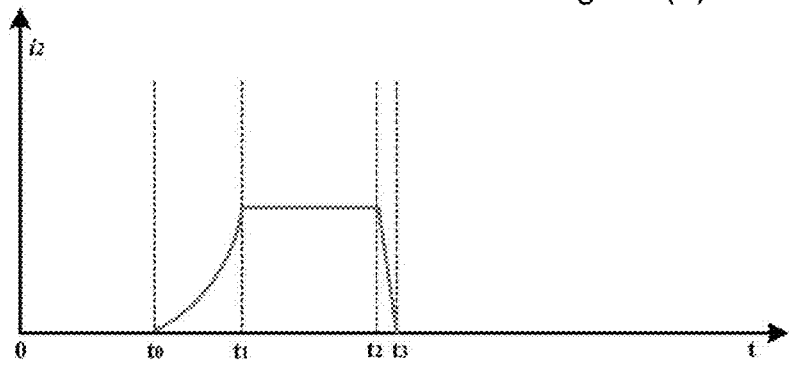
Figure 14:
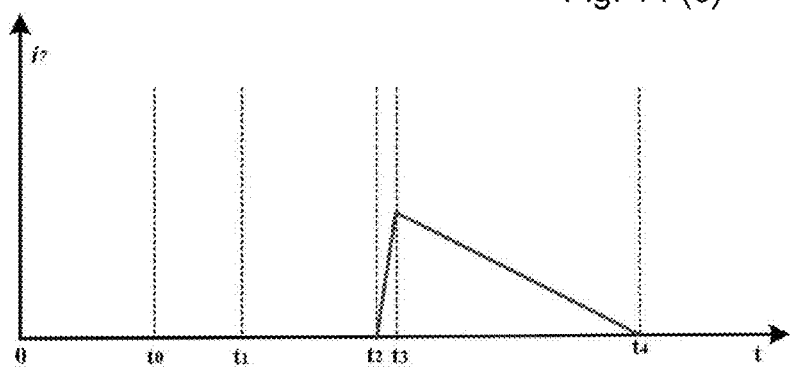
Figure 15:
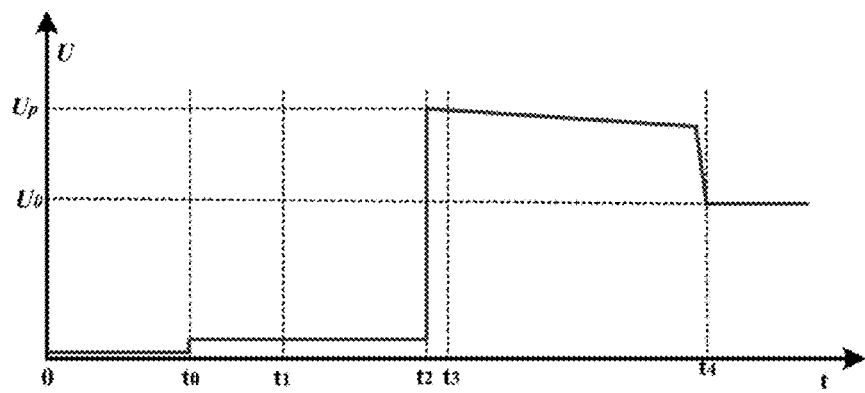
FIG. 15 is a graph of voltage of at two ends of the breaker when the breaking current of each breaker module is less than or equal to the rated current.

FIG. 12 shows the direction of current of all branches of the transfer current circuit when the breaking current of each breaker module is less than or equal to the rated current, particularly the direction of current of all branches at each moment. FIG. 13 shows a diagram after overlapping all current change curves when the breaking current is less than or equal to the rated current. FIG. 14 shows the current change curve of the transfer current circuit, particularly the current change curve of all branches i0, i1, i2 and i7, corresponding to FIG. 13, when the breaking current is less than or equal to the rated current. FIG. 15 shows the change of voltage at two ends of each breaker module when the breaking current is less than or equal to the rated current.

In this case, each breaker module may break according to the case that the breaking current is greater than the rated current, but the time for charging and discharging the capacitor is relatively long in the case of low current. Therefore, the time required by the whole breaking process is relatively long. The present invention also provides another breaking way. The specific operating steps of this breaking way comprise the following aspects:

1) Before t0, the system operates normally and the current all flows through the main current circuit, as shown in FIG. 12(*a*). The rated system voltage is U0, and the system current is a second rated current I1 (the second rated current I1 is less than or equal to the first rated current I0). When in need of breaking, the high-speed mechanical switch is controlled to perform an opening action at first.

2) At t0, the contacts of the high-speed mechanical switch start to open to generate an electric arc. The power semiconductor devices in the branch 14 of the transfer current circuit are controlled to open, and the current starts to transfer downward, as shown in FIG. 12(*b*). With the opening of the contacts of the high-speed mechanical switch, the voltage at two ends of each breaker module becomes an arc voltage. As the arc voltage is higher than the sum of voltage at two ends of the branch 14 of the transfer current circuit, the current in the high-speed mechanical switch rapidly transfers to the branch 14 of the transfer current circuit. FIG. 14(*b*) and FIG. 14(*c*) show change curves of i1 and i2.

3) At t1, the current in the high-speed mechanical switch all transfers to the branch 14 of the transfer current circuit, as shown in FIG. 12(*c*). Then, the contacts of the high-speed mechanical switch continue to move, in order to obtain a spacing large enough to withstand an over-voltage generated in the breaking process.

4) At t2, the spacing between the contacts of the high-speed mechanical switch can withstand an over-voltage generated in the breaking process. The full-controlled device A4 in the circuit 4 is controlled to turn off. The voltage at two ends of each breaker module rises sharply to reach the turn-on threshold of the over-voltage limiting circuit. The current in the branch 14 of the transfer current circuit starts to transfer to the over-voltage limiting circuit. As shown in FIG. 12(*c*), the peak of the over-voltage at two ends of each breaker module in the breaking process is Up. Then, the system current starts to drop. The voltage at two ends of each breaker module also drops somewhat as the current of the over-voltage limiting circuit drops. FIG. 14(*c*) and FIG. 14(*d*) show change curves of i2 and i7. When the system current is less than the minimal turn-on current 1 mA of the over-voltage limiting circuit, the voltage at two ends of the over-voltage limiting circuit rapidly drops.

5) At t3, the current of the over-voltage limiting circuit drops to 0, and the voltage at two ends of each breaker module drops to the system voltage, thus the whole breaking process is completed.

Figure 16:
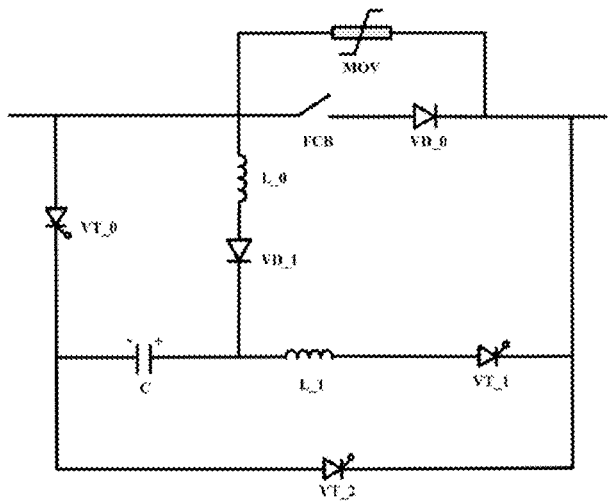
FIG. 16 is a diagram of a specific embodiment of a breaker module in the present invention.
Figure 17:
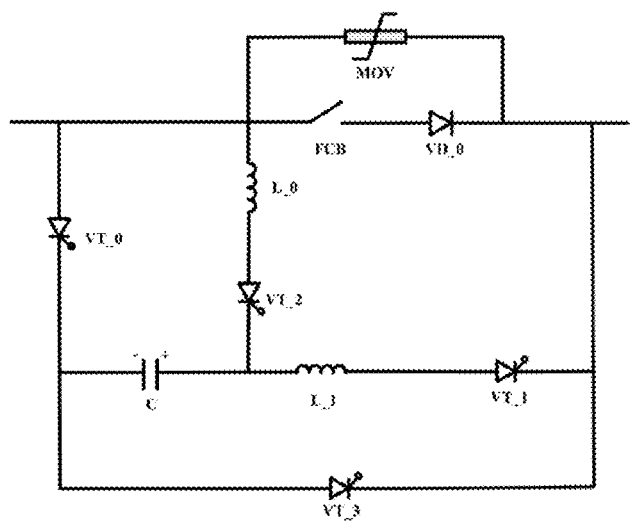
FIG. 17 is a diagram of a specific embodiment of a breaker module in the present invention.
Figure 18:
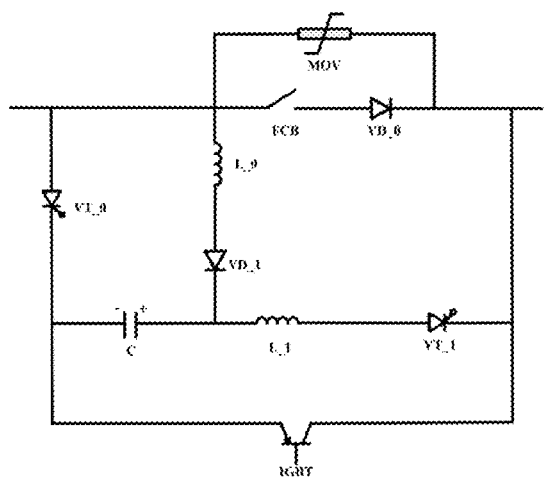
FIG. 18 is a diagram of a specific embodiment of a breaker module of the present invention.

The present invention includes, but is not limited to, the two breaking ways as described above. FIG. 16, FIG. 17 and FIG. 18 show more specific embodiments of the present invention, respectively. In FIG. 16, as there is no any full-controlled device in the transfer current circuit, the cost is low and the reliability of the devices is high; however, a long time is required for breaking at a low current. In FIG. 17, as a half-controlled device is used in the circuit 2 as A2, A1 is controlled to turn on in the breaking process so that the transfer time of the current from the circuit 1 to the circuit may be changed; and as there is no any full-controlled device, the cost is low, but a long time is required for breaking at a low current. In FIG. 18, as a full-controlled device is used in the circuit 4 as A4, when the current in the circuit 4 is less than the turn-off current of A4 in the breaking process, A4 may be controlled to turn off to further shorten the breaking time of the breaker.

Therefore, it is to be recognized that all power semiconductor devices in the present invention may be full-controlled devices. However, according to different breaking ways, A0-A4 might need to be half-controlled or full-controlled devices.

FIG. 19 shows a structure of the control system of each breaker module in the present invention.

The control system comprises a current sensor T0 for measuring the current flowing through the access terminal S1 or S2, a current sensor T1 for measuring the current flowing through the main current circuit, a current sensor T2 for measuring the current flowing through the circuit 1 in the transfer current circuit, a current sensor T3 for measuring the current flowing through the over-voltage limiting circuit, a sensor V for measuring the voltage at two ends of the high-speed mechanical switch, and a sensor P for measuring the displacement of the high-speed mechanical switch, as well as a signal conditioning circuit, a high-speed AD, a processor and a human-computer interface. The numerical values of the system current, the current of the main current circuit, the current of the circuit 1, the current of the over-voltage limit circuit, the voltage of the high-speed mechanical switch and the displacement of the high-speed mechanical switch are filtered and amplified, and then processed and calculated by the AD. The calculation includes, but is not limited to, calculating the amplitude and rate of change di/dt of the current flowing through the circuit 1. After the protection algorithm and delay control by the processor, the control to the high-speed mechanical switch and the control to the power semiconductor devices are performed. The human-computer interface displays the state of the hybrid DC breaker and the results of various calculations in real time.

It should be recognized that:

the high-speed mechanical switch is a high-speed mechanical switch based on electromagnetic repulsion, a mechanical switch driven by a high-speed motor or a high-speed mechanical switch driven by explosion.

The power semiconductor devices with a half-controlled function include any one or combinations of more of a transistor, an IGCT, an IGBT and a GTO.

The over-voltage limiting circuit comprises a varistor and auxiliary circuits thereof.

The over-voltage limiting circuit comprises an MOV consisting of zinc oxide varistors or an arrester.

4. The access process of the hybrid high-voltage DC breaker

Figure 20:
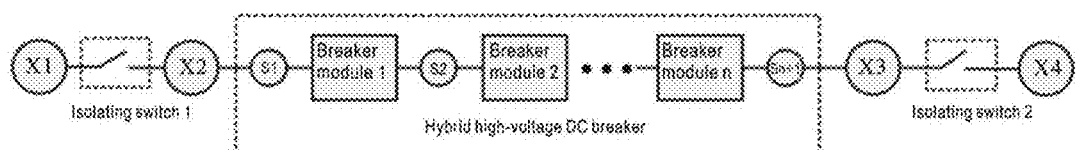
FIG. 20 is a structure diagram of the access process of a hybrid high-voltage DC breaker.

FIG. 20 shows a structure diagram of the access process of the hybrid high-voltage DC breaker, where, X1-X4 are access terminals of the system. Isolating switches 1 and 2 are devices in the access process, beyond the scope of the present invention. The specific process includes the following steps:

1) The hybrid high-voltage DC breaker is connected to the access terminals X2 and X3 of a system in the case that the isolating switch 1 and the isolating switch 2 are turned off.

The contacts of the high-speed mechanical switches of all breaker modules are turned off during the access.

2) The isolating switch 1 and the isolating switch 2 are turned on. At this moment, all power semiconductor devices of all breaker modules are turned off, and there is a system voltage at two ends of the breaker modules.

3) The power semiconductor devices A1 and A4 in each breaker module are controlled to turn on, thus the voltage at two ends of the breaker modules is limited by the turn-on voltage drop of the power semiconductor devices. At this moment, the current in each breaker module all flows through the branch 14 of the transfer current circuit.

4) The high-speed mechanical switch of each breaker module is controlled to close. As the voltage power at two ends of the high-speed switch is equal to the turn-on voltage drop of the power semiconductor devices and the voltage is low, no electric arc will be generated during the closing process.

5) After each breaker module is closed, the current flowing through A1 and A4 of each breaker module transfers to the main current circuit rapidly as the voltage at two ends of the main current circuit is less than that at two ends of the branch 14 of the transfer current circuit. After the current of each breaker module all transfers to the main current circuit, the power semiconductor devices A1 and A4 will turn off automatically.

6) The current in the hybrid high-voltage DC breaker all flows through the main current circuits of the breaker modules, thus the access process of the breaker has been completed, and the breaker starts to operate normally.

5. The short-circuit current limiting process of the hybrid high-voltage DC breaker The present invention comprises a plurality of breaker modules connected in series. Normally, the system current all flows through the main current circuits of the breaker modules, and the voltage drop at two ends of the breaker modules is very small. When the system has a short-circuit fault, one or more of the breaker modules may be controlled to perform a current limiting action, so that the current therein transfer to the over-voltage limiting circuits of the breaker modules. Thus, a certain voltage will be generated at two ends of a corresponding breaker module, that is, a certain voltage will be generated between two ends of the hybrid high-voltage DC breaker, to limit the rise of the short-circuit current.

Meanwhile, according to the requirements of the short-circuit current limiting, in the present invention, different numbers of breaker modules may be controlled to perform a current limiting action, so that different voltages may be generated at two ends of the hybrid high-voltage DC breaker to realize different levels of short-circuit current limiting function. As there is a certain limitation on the absorption of energy of the over-voltage limiting circuit, that is, the over-voltage limiting circuit has a certain upper limit of turn-on time in a certain current turn-on condition, the calculation method of the absorbed energy of the over-voltage limiting circuit is as follows: integrating the product of the voltage at two ends of the over-voltage limiting circuit and the current flowing through the over-voltage limiting circuit within the turn-on time of the over-voltage limiting circuit. When the absorbed energy of the over-voltage limiting circuit reaches the upper limit, it is requited to control the power semiconductor devices in the transfer current circuit of a corresponding breaker module to turn on, so that the current in the breaker module transfers to the transfer current circuit from the over-voltage limiting circuit to control the high-speed mechanical switch to switch on, and in turn, the current all transfers to the main current circuit again. Other breaker modules in a closed state are simultaneously controlled to perform a current limiting action to continue to maintain the current limiting function. At the end of the current limiting process, the power semiconductor devices in the transfer current circuits of all breaker modules in a current limiting state are controlled to turn on, so that the current transfers to the transfer current circuits from the over-voltage limiting circuits. Finally, the high-speed mechanical switches are controlled to close, so that the current all flows through the main current circuits of the breaker modules, the voltage drop at two ends of the hybrid high-voltage DC breaker is very small, and the hybrid high-voltage DC breaker returns to operate normally.

For example, m breaker modules are controlled to perform a short-circuit current limiting action during the short-circuit current limiting process, in order to make the current therein transfer to the over-voltage limiting circuits of the breaker modules, where, $0<m<n$, and m is variable, thus different voltages, i.e., required voltages, may be generated at two ends of the hybrid high-voltage DC breaker.

Preferably, m different breaker modules are controlled in turn to perform a current limiting action during the current limiting process, in order to avoid the absorbed energy of the over-voltage limiting circuits reaching the upper limit.

Figure 21:
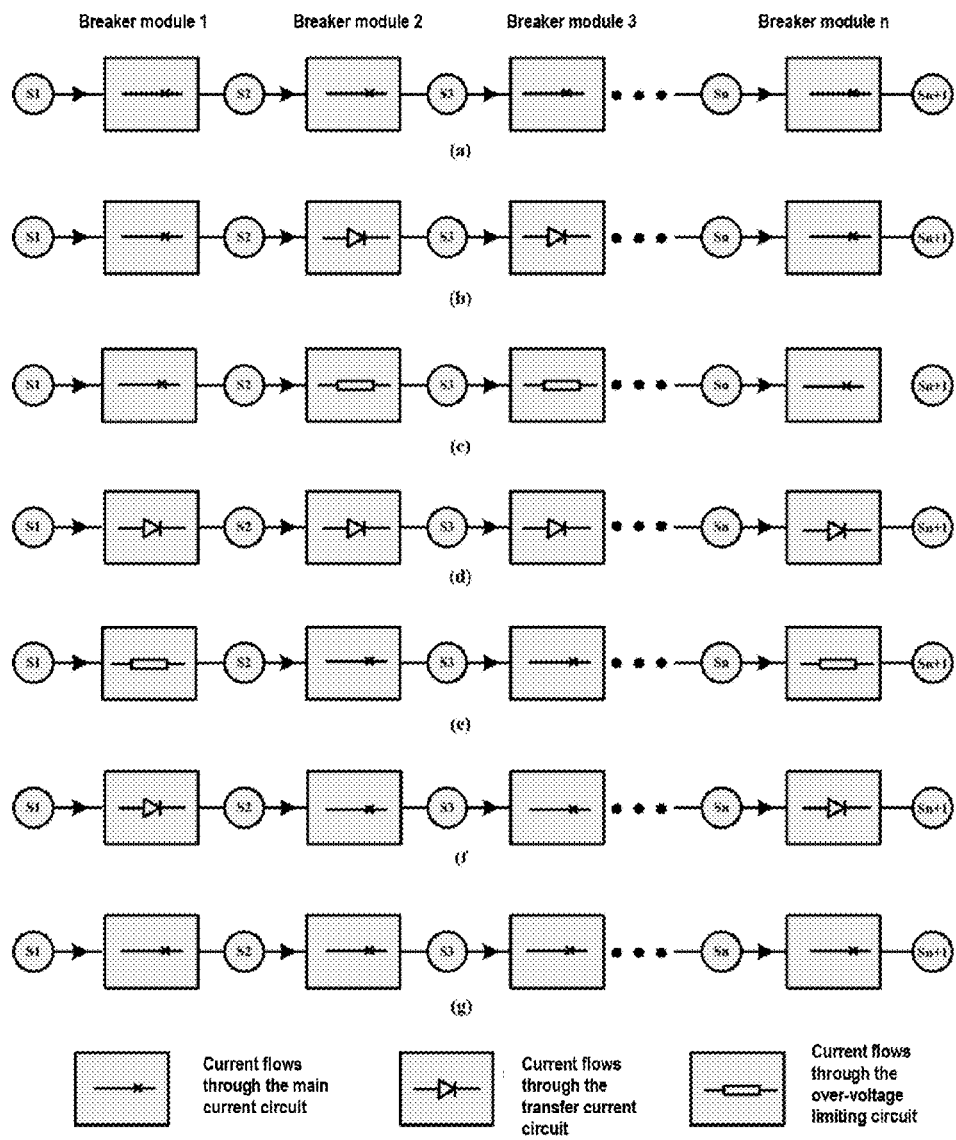
FIG. 21 is a schematic diagram of the short-circuit current limiting process of a hybrid high-voltage DC breaker.

FIG. 21 shows a schematic diagram of the short-circuit current limiting process of the hybrid high-voltage DC breaker. The specific process comprises the following steps:

1) In a normally operating state, the current in the hybrid high-voltage DC breaker all flows through the main current circuits, as shown in FIG. 21(*a*).

2) When the system has a short-circuit fault, m ($0<m<n$) breaker modules among n($n>1$) breaker modules are controlled to perform a current limiting action at first, so that the current transfers to the power semiconductor devices of the transfer current circuits, as shown in FIG. 21(*b*).

3) When the voltage at two ends of the transfer current circuits of the m breaker modules reaches the turn-on voltage threshold of the over-voltage limiting circuits connected at two ends of the transfer current circuits in parallel, the over-voltage limiting circuits of the m breaker modules are turned on to generate a certain voltage drop at two ends of the over-voltage limiting circuits, in order to limit the rise of the short-circuit current, as shown in FIG. 21(*c*).

4) As there is a certain limitation on the absorption of energy of the over-voltage limiting circuits, the over-voltage limiting circuits need to be turned off to cool and dissipate energy after they are turned on for a certain period of time. Therefore, when the turn-on time of the over-voltage limiting circuits of the m breaker modules reaches an upper limit, the power semiconductor devices of the transfer current circuits are controlled to turn on, thus the current in the over-voltage limiting circuits transfers to the transfer current circuits rapidly. Meanwhile, m breaker modules among the remaining n-m breaker modules are controlled to perform an opening action, so that the current starts to transfer to the transfer current circuits, as shown in 21(*d*).

5) When the voltage at two ends of the transfer current circuits of the later m hybrid breaker modules performing the current limiting action reaches the turn-on threshold of the over-voltage limiting circuits, a certain voltage drop will be generated at two ends of the m breaker modules to limit the rise of the short-circuit current, as shown in FIG. 21(*e*). In the above way, m different breakers are controlled in turn to perform a current limiting action so that the continuous short-circuit current limiting function may be realized. Meanwhile, the number of breaker modules performing the current limiting action may be adjusted according to the requirements of the short-current current limiting, that is, m is adjusted, in order to realize different levels of current limiting function.

6) After the current limiting process is completed, the transfer current circuits of the breaker modules, the over-voltage limiting circuits of which are turned on, are controlled to turn on, so that the current transfers to the power semiconductor devices of the transfer current circuits, as shown in FIG. 21(f).

7) The high-speed mechanical switches of all breaker modules are controlled to perform an opening action, so that the current all transfers to the main current circuits, and the current limiting process of the breaker is completed, as shown in FIG. 21(g).

6. The breaking process of the hybrid high-voltage DC breaker

When the hybrid high-voltage DC breaker needs to perform an opening action, as the voltage at two ends of the over-voltage limiting circuit of a single breaker module is less than the system voltage after the single breaker module is opened, the current continues to flow through the breaker module; as a result, it is unable to break the circuit. Therefore, it is required to control all breaker modules in the hybrid high-voltage DC breakers to perform an opening action in order to generate a voltage drop greater than the system voltage at two ends of the breaker. In this way, the current flowing through all breaker modules will drop, and the breaking is finally completed.

Figure 22:
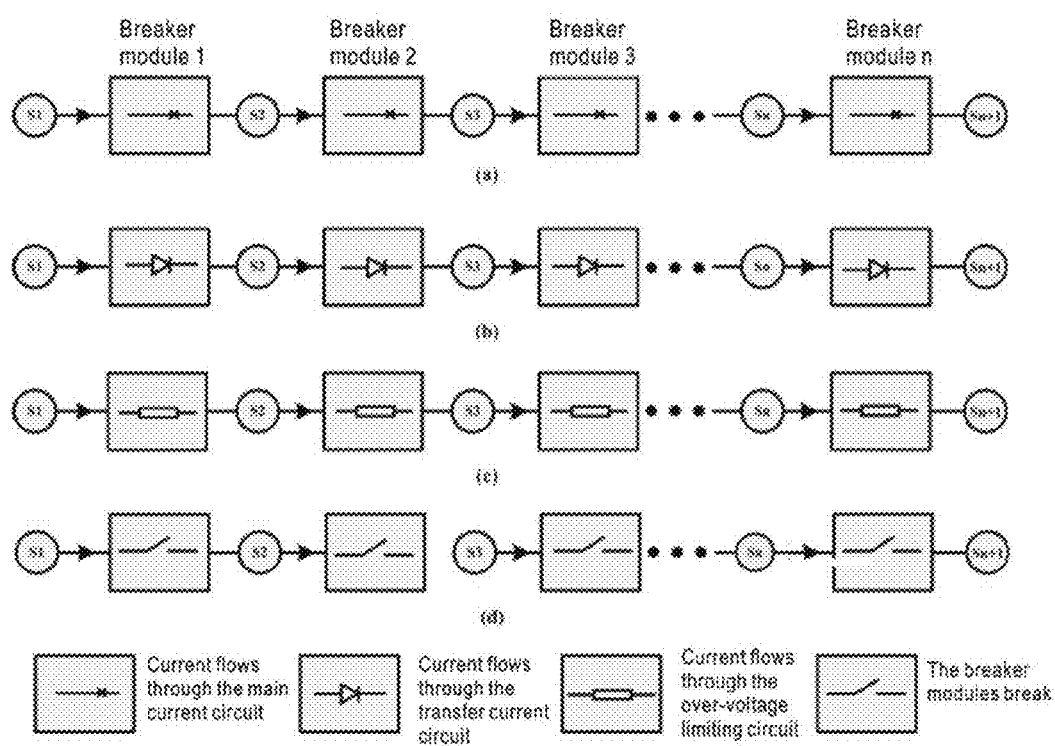
FIG. 22 is a schematic diagram of the short-circuit breaking process of a hybrid high-voltage DC breaker.

FIG. 22 shows a schematic diagram of the breaking process of the hybrid high-voltage DC breaker. The specific process comprises the following steps:

1) In a normally operating state, the current in the hybrid high-voltage DC breaker all flows through the main current circuits, as shown in FIG. 22(a).

2) When in need of performing an opening action, all breaker modules are controlled to perform an opening action at first, so that the current transfers to the power semiconductor devices of the transfer current circuits, as shown in FIG. 22(b).

3) When the voltage at two ends of the transfer current circuits of the breaker modules reaches the turn-on threshold pf the over-voltage limiting circuits connected at two ends of the transfer current circuits in parallel, the over-voltage limiting circuits are turned on. When the over-voltage limiting circuits of all breaker modules are turned on, the voltage drop at two ends of the hybrid high-voltage DC breaker is higher than the system voltage, and the system current starts to drop, as shown in FIG. 22(c).

4) When the system current is dropped to 0, the current in the over-voltage limiting circuits of all breaker modules is cut off, and the over-voltage limiting circuits are turned off, so that the hybrid high-voltage DC breaker breaks the short circuit, and all breaker modules are at a breaking state, as shown in 22(d).

The present invention discloses a hybrid high-voltage DC breaker, consisting of a plurality of breaker modules. Each of the breaker modules comprises a main current circuit, a transfer current circuit, an over-voltage limiting circuit and a control system. The transfer current circuit comprises a pre-charged capacitor, sensors and power semiconductor devices. When the breaking current of each breaker module is greater than or equal to the rated current, by controlling the power semiconductor devices of the transfer current circuit to act according to a certain timing sequence, the contacts of the high-speed mechanical switch may be opened without an electric arc, and the direction of current of the pre-charged capacitor may be changed, further, the direction of voltage at two ends of the pre-charged capacitor is changed to limit the rate of rise of the breaking over-voltage at two ends of the breaker modules. As the high-speed mechanical switch is opened without an electric arc and the medium between the contacts has a good recovery property, with the limitation of the transfer current circuit to the breaking over-voltage, the reliability of breaking can be improved significantly. When the breaking current of each breaker module is less than the rated current of the breaker module, the power semiconductor devices in the transfer current circuit are controlled to turn on at first to make the current rapidly transfer to the power semiconductor devices after the switch is turned on; and when the spacing between the contacts of the high-speed mechanical switch can withstand and recover an over-voltage, the current in the transfer current circuit is cut off by the power semiconductor devices with a gate-turn-off function so as to realize the breaking. As the direction of the voltage on the pre-charged capacitor is kept unchanged after the breaker modules break, breaking may be repeated after the pre-charged capacitor is charged for the first time. Therefore, the means for charging the capacitor is omitted.

By the connection of the hybrid breaker modules in series, the applied voltage grade may be improved. Meanwhile, as the connection of all breaker modules is convenient, the number of breaker modules to be connected in series can be adjusted according to the actual system voltage requirement. The breaker disclosed by the present invention not only can break a short circuit at a high voltage or in other applications, but also can realize the short-circuit current limiting function under a high-voltage grade by controlling parts of breaker modules to perform an opening action.

The foregoing is further description of the present invention in details by specific preferred implementation ways, and the specific implementation ways of the present invention shall not be regarded to be limited thereto. For a person of ordinary skill in the art should understand that, the present invention may have various simple deductions or replacements, and these deductions or replacements should be considered to fall into the protection scope of the present invention defined by the appended claims.

What is claimed is:

1. A hybrid high-voltage DC breaker, consisting of n completely identical breaker modules, all of which are connected in series and the modules number is from 1 to n, S1-Sn+1 are n+1 system access terminals for the breaker modules, wherein each of the breaker modules comprises a main current circuit, a transfer current circuit, an over-voltage limiting circuit, a control system, and access terminals Si and Si+1 of the system, where $1 \leq 1 \leq n$, and the main current circuit, the transfer current circuit and the over-voltage limiting circuit are connected in parallel, wherein:

(1) the main current circuit consists of a high-speed mechanical switch and a first power semiconductor device, which are connected in series, wherein: the access terminal Si is connected with one end of the high-speed mechanical switch to realize the connection of the access terminal Si with one end of the main current circuit; the other end of the high-speed mechanical switch is connected with one end of the first power semiconductor device; and the other end of the first power semiconductor device is connected with the access terminal Si+1 to realize the connection of the access terminal Si+1 with the other end of the main current circuit;

(2) the transfer current circuit comprises a first circuit consisting of a second power semiconductor device, a second circuit consisting of an first inductor and a third power semiconductor device connected in series, a third circuit consisting of an second inductor and a fourth power semiconductor device connected in series, a fourth circuit consisting of a fifth power semiconductor device, and a pre-charged capacitor pre-charged with a certain voltage, the first circuit being connected with the fourth circuit in series, the second circuit being connected with the third circuit in series, wherein:

(A) the first circuit is connected with the fourth circuit in series to form a first branch of the transfer current circuit, and the first branch is connected with the main current circuit in parallel, furthermore: the access terminal Si is connected with one end of the second power semiconductor device to realize the connection with one end of the first branch; the other end of the second power semiconductor device is connected with one end of the fifth power semiconductor device to realize the connection in series of the first circuit with the fourth circuit; and the other end of the fifth power semiconductor device is connected with the access terminal S2 to realize the connection of the other end of the first branch with the access terminal S2, in order to realize the connection in parallel of the first branch with the main current circuit;

(B) the second circuit is connected with the third circuit in series to form a first branch of the transfer current circuit, and the first branch is connected with the main current circuit in parallel, furthermore: the access terminal Si is connected with one end of the first inductor to realize connection with one end of the first branch;

the other end of the first inductor is connected with one end of the third power semiconductor device; the other end of the third power semiconductor device is connected with one end of the second inductor to realize the connection in series of the second circuit with the third circuit; the other end of the second inductor is connected with one end of the fourth power semiconductor device; and the other end of the fourth power semiconductor device is connected with the access terminal S2 to realize the connection of the other end of the second branch with the access terminal Si+1, in order to realize the connection in parallel of the second branch with the main current circuit; and (C) the pre-charged capacitor is connected between an endpoint between the first circuit and the fourth circuit and an endpoint between the second circuit and the third circuit; and (3) the control system measures the current flowing through the access terminal Si or Si+1, the current flowing through the main current circuit, the current flowing through the first circuit in the transfer current circuit, the current flowing through the over-voltage limiting circuit, the voltage at two ends of the high-speed mechanical switch and the displacement of the high-speed mechanical switch, and controls the high-speed mechanical switch and the second, third, fourth and fifth power semiconductor devices in the transfer current circuit to act by measuring the current amplitude and current rate of change of the main current circuit and the current amplitude and current rate of change of the first circuit in the transfer current circuit.

2. The breaker according to claim 1, wherein: When the breaker modules are in a normal operating state, current flows through the main current circuit, and the pre-charged capacitor is pre-charged with a certain voltage, the direction of the voltage being opposite to the direction of a turn-on voltage drop of the main current circuit;

at this moment, the first, second, third and fourth circuits in the transfer current circuit are all turned off, so that no current flows through the transfer current circuit and also no current flows through the over-voltage limiting circuit; and when the system needs to break, the control system first controls the high-speed mechanical switch in the main current circuit to open, however, at this moment, the contact of the high-speed mechanical switch is still closed as the high-speed mechanical switch has a mechanical time delay; and then, the control system determines whether the second, third, fourth and fifth power semiconductor devices in the transfer current circuit to act or not and a corresponding timing sequence for action by measuring the current amplitude and current rate of change of the main current circuit and the current amplitude and current rate of change of the circuit 1 in the transfer current circuit.

3. The breaker according to claim 1, wherein the control system comprises a first current sensor for measuring the current flowing through the access terminal S1 or S2, a second current sensor for measuring the current flowing through the main current circuit, a third current sensor for measuring the current flowing through the first circuit in the transfer current circuit, a fourth current sensor for measuring the current flowing through the over-voltage limiting circuit, a first sensor for measuring the voltage at two ends of the high-speed mechanical switch, and a second sensor for measuring the displacement of the high-speed mechanical switch, as well as a signal conditioning circuit, a high-speed AD, a processor and a human-computer interface, the processor calculating the amplitude and rate of change di/dt of the current flowing through the system, the main current circuit and the first circuit, the human-computer interface displaying the state of the hybrid DC breaker and the results of calculation in real time.

4. The breaker according to claim 2, wherein the first and third power semiconductor devices are power semiconductor devices with a single-way turn-on function or combinations thereof; and, the second, fourth and fifth power semiconductor devices are power semiconductor devices with a single-way turn-on function and a half-controlled function or combinations thereof, and the power semiconductor devices with a half-controlled function include, but are not limited to, any one or combinations of more of a transistor, an IGCT, an IGBT and a GTO.

5. The breaker according to claim 3, wherein, according to different breaking ways of breakers, one or more of the first, second, third, fourth and fifth power semiconductor devices are full-controlled devices.

6. The breaker according to claim 5, wherein: the over-voltage limiting circuit is turned-off in the case that the breaker modules operate normally, the leakage current being less than 1 µA; and the turn-on voltage threshold of the over-voltage limiting circuit is 1.5 times of the voltage of the system with the breaker.

7. The breaker according to claim 6, wherein when in need of short-circuit current limiting, m breaker modules are controlled to perform a short-circuit current limiting action, to transfer current therein to the over-voltage limiting circuits of the breaker modules, so as to establish different voltages at two ends of the hybrid high-voltage DC breaker, where 0<m≤n, and m is variable.

8. The breaker according to claim 7, wherein, during the current limiting process, the m breaker modules are controlled in turn to perform the short-circuit current limiting action.

9. The breaker according to claim 8, wherein: when in need of opening, all breaker modules in the hybrid high-voltage DC breaker are controlled to perform an opening action.

\* \* \* \* \*